US012034189B2

United States Patent
Arcelona et al.

(10) Patent No.: US 12,034,189 B2
(45) Date of Patent: Jul. 9, 2024

(54) FUEL CELL SYSTEM GLOW PLUG AND METHOD OF FORMING SAME

(71) Applicant: BLOOM ENERGY CORPORATION, Sunnyvale, CA (US)

(72) Inventors: Nicholas Arcelona, Milpitas, CA (US); Martin Perry, Mountain View, CA (US); Vlad Kalika, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 1206 days.

(21) Appl. No.: 14/666,495

(22) Filed: Mar. 24, 2015

(65) Prior Publication Data

US 2015/0288006 A1    Oct. 8, 2015

Related U.S. Application Data

(60) Provisional application No. 61/975,233, filed on Apr. 4, 2014.

(51) Int. Cl.
*H01M 8/04007* (2016.01)
*F23Q 7/00* (2006.01)
(Continued)

(52) U.S. Cl.
CPC ........ *H01M 8/04037* (2013.01); *F23Q 7/001* (2013.01); *H01M 8/1246* (2013.01);
(Continued)

(58) Field of Classification Search
CPC ...... F02N 19/06; F16J 15/28; G01N 27/4078; H01T 4/12; H01T 13/08; F23Q 7/00;
(Continued)

(56) References Cited

U.S. PATENT DOCUMENTS 3,749,980 A * 7/1973 Baxter .................... F23Q 7/001
                                                    123/145 A
4,329,174 A * 5/1982 Ito ......................... C22C 19/058
                                                    420/433
(Continued)

FOREIGN PATENT DOCUMENTS

DE        10346330 A1 *  5/2005 ............. F23Q 7/001
DE    102006041124 A1 *  3/2008 ............. G01L 23/22
(Continued)

OTHER PUBLICATIONS

Lucas Milhaup, Brazing versus Welding, 2001, https://www.brazingbook.com/brazing-vs-welding/.*

(Continued)

*Primary Examiner* — Ula C Ruddock
*Assistant Examiner* — Anna Korovina
(74) *Attorney, Agent, or Firm* — THE MARBURY LAW GROUP PLLC

(57) ABSTRACT

A method of sealing a glow plug of a fuel cell system, the glow plug including a housing and a heating element extending from a first end of the housing. The method includes inserting the heating element into a sealing element having an annular base and a tubular collar extending from the base and forming a fluid-tight connection between the glow plug and the fuel cell system by attaching the collar to the heating element and by attaching the base to the first end of the housing.

11 Claims, 7 Drawing Sheets

(51) Int. Cl.
*H01M 8/1246* (2016.01)
*H01M 8/0271* (2016.01)
*H01M 8/12* (2016.01)
*H01M 8/2465* (2016.01)

(52) U.S. Cl.
CPC .. *H01M 8/0271* (2013.01); *H01M 2008/1293* (2013.01); *H01M 8/2465* (2013.01); *H01M 2300/0074* (2013.01)

(58) Field of Classification Search
CPC ..... F23Q 7/22; F23Q 7/27; F23Q 7/24; F23Q 7/0001
See application file for complete search history.

(56) References Cited

U.S. PATENT DOCUMENTS

| | | | |
|---|---|---|---|
| 4,592,134 A * | 6/1986 | Walton | F23Q 7/001 29/611 |
| 4,943,494 A | 7/1990 | Riley | |
| 5,741,605 A | 4/1998 | Gillett et al. | |
| 6,512,204 B1 | 1/2003 | Chiu et al. | |
| 6,689,990 B2 * | 2/2004 | Taniguchi | F23Q 7/001 123/145 A |
| 6,844,525 B2 * | 1/2005 | Yoshikawa | F23Q 7/001 219/270 |
| 8,563,180 B2 | 10/2013 | Perry et al. | |
| 8,877,399 B2 | 11/2014 | Weingaertner et al. | |
| 8,921,001 B2 | 12/2014 | Huynh et al. | |
| 2002/0170903 A1 | 11/2002 | Taniguchi et al. | |
| 2002/0195443 A1* | 12/2002 | Tanaka | F23Q 7/001 219/541 |
| 2004/0137302 A1 | 7/2004 | Gilman et al. | |
| 2005/0061063 A1* | 3/2005 | Haussner | F23Q 7/001 73/114.18 |
| 2006/0263665 A1 | 11/2006 | Schaevitz et al. | |
| 2007/0289370 A1* | 12/2007 | Hirose | F23Q 7/001 73/114.21 |
| 2008/0095943 A1* | 4/2008 | May | F23Q 7/001 427/376.1 |
| 2009/0056660 A1* | 3/2009 | Goto | F23Q 7/001 123/145 A |
| 2009/0266135 A1* | 10/2009 | Knaup | B21D 22/02 72/377 |
| 2010/0009221 A1 | 1/2010 | Ballantine et al. | |
| 2010/0122975 A1 | 5/2010 | Burrows et al. | |
| 2010/0133253 A1* | 6/2010 | Walker, Jr. | F23Q 7/001 219/270 |
| 2010/0147822 A1 | 6/2010 | Burrows et al. | |
| 2010/0167154 A1* | 7/2010 | Ono | H01M 8/0247 429/457 |
| 2011/0215080 A1* | 9/2011 | Hain | F23Q 7/001 219/270 |
| 2012/0202130 A1 | 8/2012 | Weingaertner et al. | |
| 2012/0270117 A9 | 10/2012 | Venkataraman et al. | |
| 2013/0319094 A1* | 12/2013 | Nakamura | G01M 15/08 73/114.19 |
| 2014/0162162 A1 | 6/2014 | Kalika et al. | |
| 2014/0352640 A1* | 12/2014 | Okinaka | F02P 19/028 123/145 A |
| 2014/0373799 A1* | 12/2014 | Suzuki | F23Q 7/00 123/145 A |

FOREIGN PATENT DOCUMENTS

| | | | | |
|---|---|---|---|---|
| JP | H11287441 A | 10/1999 | | |
| JP | 2003148731 A | 5/2003 | | |
| JP | 2004107135 A | 4/2004 | | |
| JP | 2012512373 A | 5/2012 | | |
| JP | 2013055008 A | 3/2013 | | |
| JP | 2014057759 A | 3/2014 | | |
| WO | WO-9403305 A1 * | 2/1994 | ......... B23K 35/3013 | |
| WO | WO-2013099226 A1 * | 7/2013 | | |

OTHER PUBLICATIONS

Tekkaya et al., Sheet Metal Forming Fundamentals, Materials Park, Ohio : ASM International. 2012, Chapter 2, pp. 5-25 (Year: 2012).*
Wegman et al., Surface Preparation Techniques for Adhesive Bonding, 2013, Chapter 7, pp. 105-114, https://doi.org/10.1016/C2012-0-02158-8 (Year: 2013).*
Houben et al., DE 10346330 Machine Translation (Year: 2005).*
International Preliminary Report on Patentability for International Search Report for PCT/US2015/022122, dated Oct. 13, 2016, 14 pages.
International Search Report for PCT/US2015/022122, dated Jul. 31, 2015, 3 pages.
Written Opinion of the International Searching Authority for PCT/US2015/022122, dated Jul. 31, 2015, 12 pages.
International Search Report and Written Opinion received in connection with international application No. PCT/US2013/070505; dated Feb. 24, 2014.
Promat Freeflow®, Free Pouring Granules of High Temperature Insulation, http://www.microtherm.uk.com/landingpage/assets/TDS_FREEFLOW_V1-EN.pdf, Nov. 2013.
First Office Action from Japan Patent Office for Japanese Patent Application No. 2016-556296, dated Aug. 7, 2018, 4 pages.
Office Action from Japan Patent Office, Second Notice of Reason for Refusal, for Japanese Patent Application No. 2016-556296, dated May 14, 2019, 5 pages.

* cited by examiner

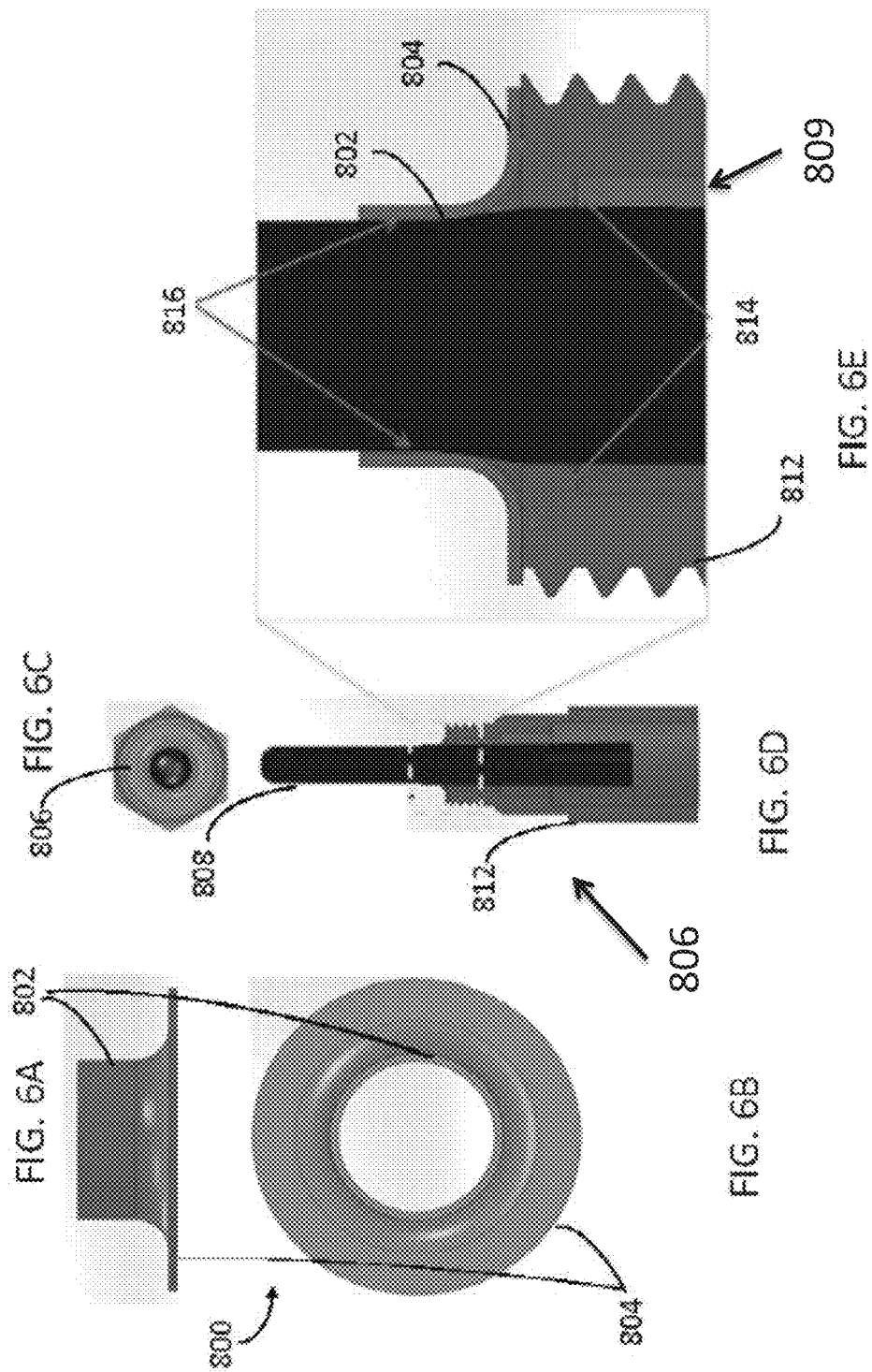

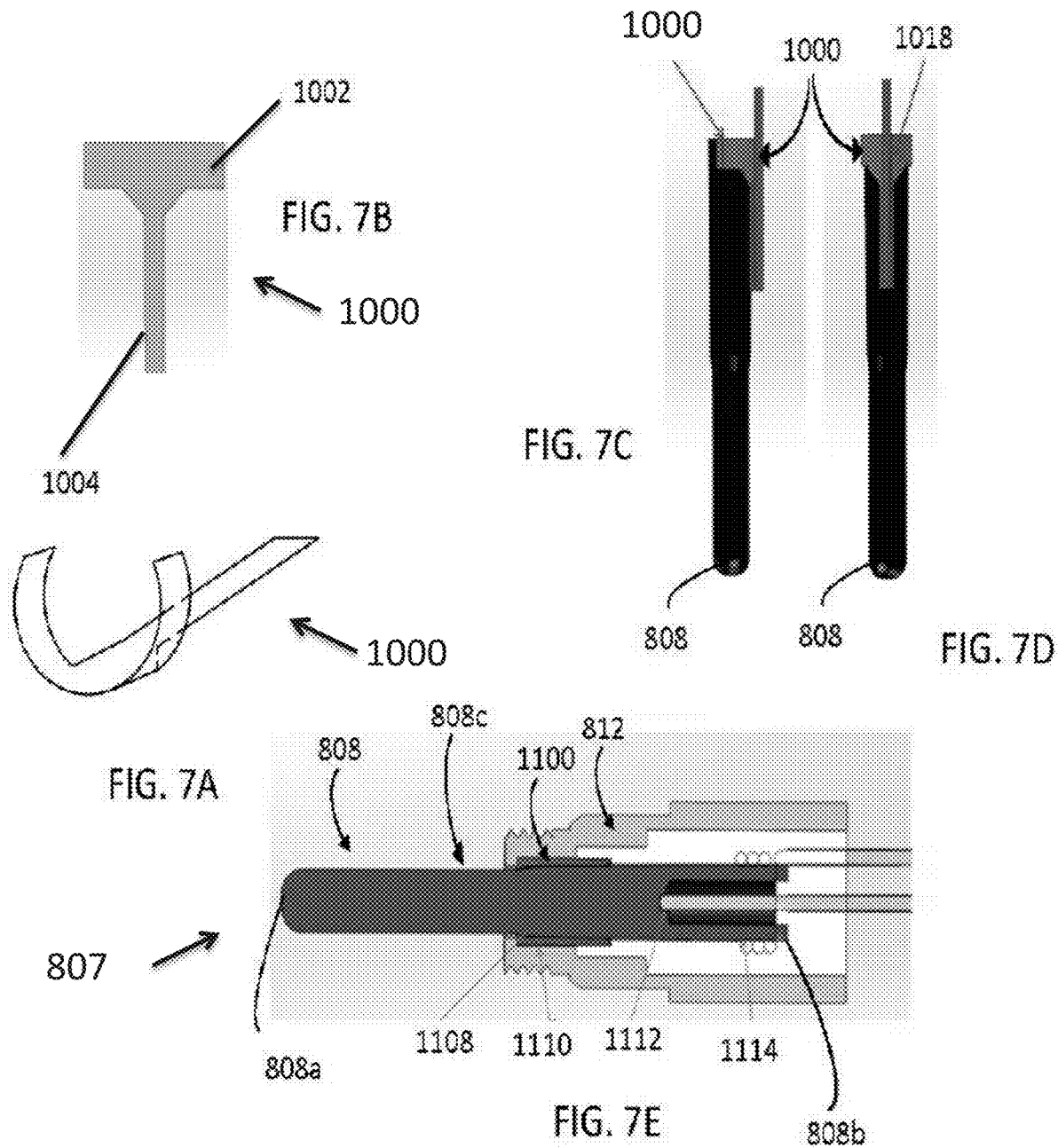

FUEL CELL SYSTEM GLOW PLUG AND METHOD OF FORMING SAME

CROSS-REFERENCE TO RELATED APPLICATIONS

The present application is related to and claims priority to U.S. Provisional Application No. 61/975,233, filed Apr. 4, 2014, the entire contents of which are incorporated by reference herein.

FIELD

The present invention is directed to fuel cell systems, and more specifically, to a glow plug for a solid oxide fuel cell (SOFC) system.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

Various embodiments relate to a method of sealing a glow plug of a fuel cell system, the glow plug comprising a housing and a heating element extending from a first end of the housing, the method comprising: inserting the heating element into a sealing element comprising an annular base and a tubular collar extending from the base; and forming a fluid-tight connection between the glow plug and the fuel cell system by attaching the collar to the heating element and by attaching the base to the first end of the housing.

Various embodiments relate to a glow plug for a solid oxide fuel cell system, the glow plug comprising: a housing; a heating element extending from a first end of the housing; and a sealing element configured to form a fluid-tight connection between the housing and the heating element, the sealing element comprising an annular base attached to the first end of the housing; and a tubular collar extending from the base and attached to the heating element.

Various embodiments relate to a solid oxide fuel cell system comprising: a hot box housing; a fuel cell stack disposed in the hot box housing; and the glow plug extending through an opening of the hot box housing.

Various embodiments relate to a glow plug for a solid oxide fuel cell system, the glow plug comprising: a housing; a heating element extending from a first end of the housing; and a landing pad disposed in the housing, the landing pad comprising a collar attached to the heating element and a lead connection extending from the collar.

Various embodiments relate to a glow plug for a solid oxide fuel cell system, the glow plug comprising: a housing; a heating element extending from the housing; and a sealing ring disposed between the heating element and the housing, the sealing ring comprising a glass.

BRIEF DESCRIPTION OF THE DRAWINGS

FIGS. 6A and 6B are side and top views of a sealing member according to various embodiments.

FIGS. 6C and 6D are top and side views of a glow plug including the sealing member of FIGS. 6A and 6B, according to various embodiments.

FIG. 6E is a side cross-sectional expanded view of the inset area of FIG. 6D.

FIG. 7A is a perspective view and FIG. 7B is a top view of a landing pad according to various embodiments.

FIGS. 7C and 7D are side and top views of the landing pad of FIGS. 7A and 7B attached to a heating element, according to various embodiments.

FIG. 7E is a side cross-sectional view of a glow plug according to various embodiments.

DETAILED DESCRIPTION

To maintain a high operating efficiency, a desired temperature of the fuel cells should be maintained throughout operation. However, gaps within layers in the fuel cell hot box and instrumentation feed-through holes may introduce significant heat leaks, resulting in undesired temperature variation. Additionally, high temperature operation and variations in temperatures may cause stress and damage to fuel cell components.

Components such as glow plugs may be inserted through feed-through holes. Glow plugs are fuel cell components having a heating element that provides heat for maintaining SOFC operation. Glow plugs are typically inserted into the reaction chamber, often contained within a housing of a glow plug assembly. Because glow plugs are provided into SOFC reaction chambers through feed-through holes, the glow plugs or heating elements that are inserted into the reaction chambers should be sealed to prevent leaks that may occur between the element and the housing that supports the element and facilitates insertion. Further, components in or near the reaction chambers may be exposed to extreme operating temperatures, and extreme variations of temperature. Because of extreme temperature conditions and variations, differences in coefficients of thermal expansion (CTEs) between housing components and heating elements may cause stresses leading to micro-crack formation in the heating elements, which may shorten the life of the heating elements, may give rise to leaks, and may reduce the operational reliability and longevity of the SOFC.

Figure 1A:
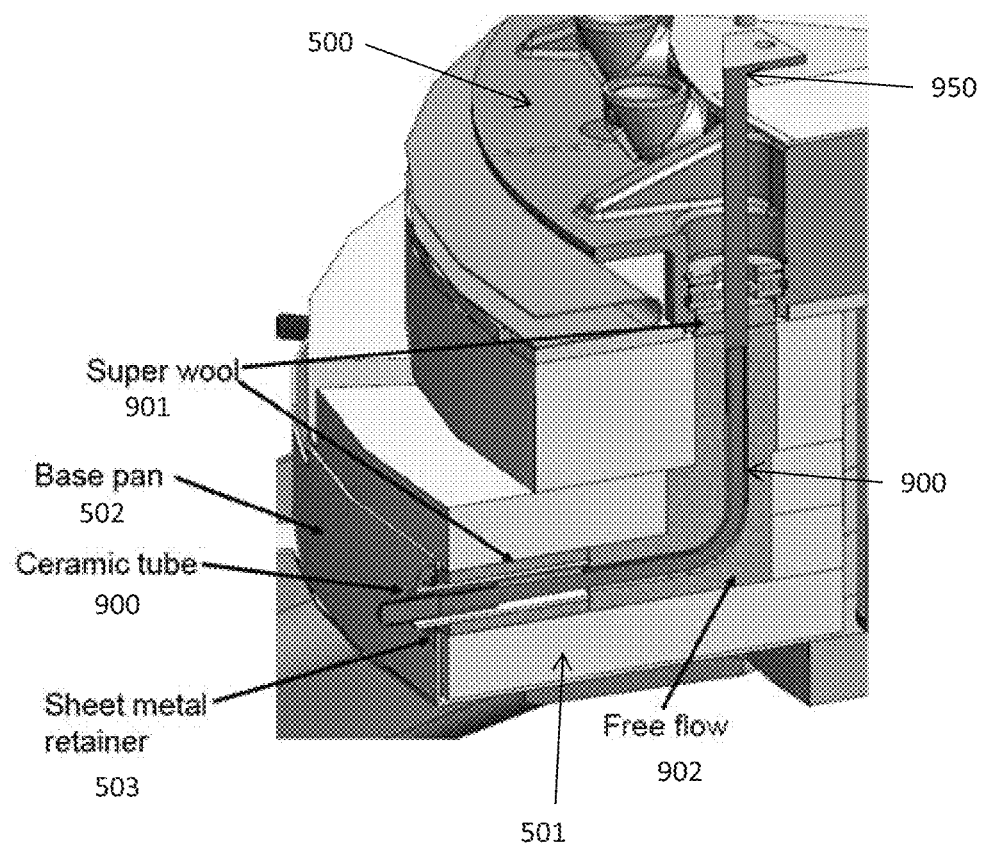
FIG. 1A is a three dimensional cut-away view illustrating the base portion of a SOFC system according to a comparative example.

Embodiments of the present invention are drawn to solid oxide fuel cell (SOFC) systems and methods of sealing a glow plug and/or glow plug assembly, to provide resilience to temperature cycles or fluctuations during operation of high temperature SOFC systems and reduce glow plug failure. Further, by maintaining stable temperatures during operation of high temperature SOFC systems using insulation as disclosed herein, both the thermal efficiency and the electrical efficiency may be improved, and the possibility of glow plug failure may be reduced in these systems. Embodiments may optionally be drawn to an SOFC system that includes a pourable insulation material to improve thermal efficiency. One type pourable insulation material may be a "free flow" insulation which is a fluid that can be poured into an opening in the SOFC housing, but which solidifies into a high temperature resistant material when cured. Alternatively, the pourable insulation material is a flowable insulation material that does not need to be cured. One method of insulating the base portion of a high temperature fuel cell system is disclosed in U.S. patent application Ser. No. 13/344,304, filed Jan. 5, 2012, and hereby incorporated by reference in its entirety. The result of this method is illustrated in FIG. 1A. The fuel cell stacks (not shown) are positioned on a stack support base 500 which is located over a base pan 502 filled with insulation 501. The stack support base 500 contains a bridging tube 900 that eliminates the need for one of the seal elements. The bridging tube 900 may be made of an electrically insulating material, such as a ceramic, or it may be made of a conductive material that is joined to a ceramic tube outside the base pan 502. The use of a bridging tube 900 eliminates an air leak path. The current collector/electrical terminal 950 from the stacks is routed in the bridging tube 900 from top of the stack support base 500, through a base insulation 501 made of a microporous board, and out of the base pan 502. A sheet metal retainer 503 may be used to fix the tube 900 to the base pan 502. In embodiments to be described in further detail herein below, similar configurations may be used to provide an insertion point and routing for electrical wiring for a glow plug. In an embodiment in which a glow plug is inserted, the electrical wiring may extend from the external side of the glow plug through the sidewall 330 of the outer housing 300 of the hotbox, or through the base pan 502.

The tube 900 may be insulated in the base with super wool 901 and/or a pourable insulation material 902. The pourable insulation material may be the "free flow" insulation 902, which is poured into an opening in the base 500 around the tube 900 and then solidifies into a high-temperature resistant material, when cured. The pourable insulation material 902 fills less than 10 volume % of the base cavity around the tube 900. In an alternative embodiment, the pourable insulation material 902 is made of dry solid granular particles. Conduits for a glow plug assembly and electrical connections to the glow plug assembly may also be insulated in the manner described, to reduce thermal variations and thermal exposure to the glow plug elements.

Figure 1B:
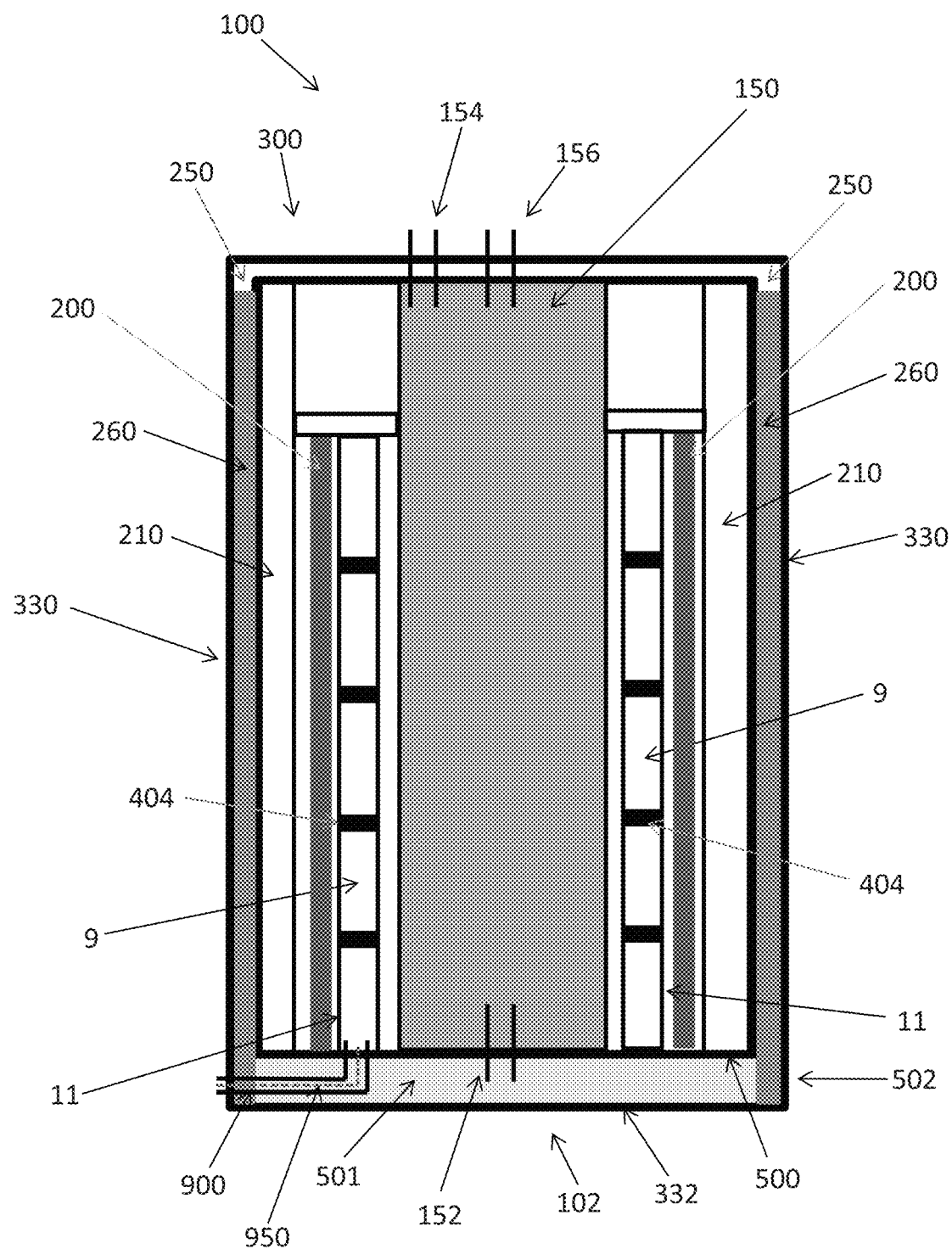
FIG. 1B is a schematic illustration of a cross section of a SOFC system according to an exemplary embodiment.

FIG. 1B is a cross section illustrating a first embodiment of a SOFC system 100. The SOFC system 100 includes one or more columns 11 of fuel cell stacks 9 located on the stack support base 500. Each fuel cell stack includes one or more fuel cells as described in the U.S. patent application Ser. No. 13/344,304, hereby incorporated by reference in its entirety. Fuel manifolds 404 may be located between the fuel cell stacks 9 in the columns 11. The columns 11 of fuel cell stacks 9 may be located on a base plate 500 and arrayed about a central plenum 150. The central plenum 150 may include various balance of plant components, such as a reformer and/or heat exchanger, such as an anode cooler heat exchanger and/or an anode exhaust gas recuperator (not shown). The central plenum 150 of the SOFC system 100 also includes a fuel input conduit 152, an oxidant input conduit 154, a fuel/oxidant exhaust output conduit 156 (e.g., anode tail gas oxidizer output comprising fuel exhaust oxidized by the oxidant exhaust).

The SOFC system 100 also includes a cathode recuperator 200 located about an outer periphery of the columns 11 of fuel cell stacks 9. To insulate the SOFC system 100 from heat loss, a resilient insulating layer 210 may be provided in the gap between the cathode recuperator 200 and the sidewall 330 of the outer housing 300 (e.g. hot box) of the SOFC system 100. To further insulate the SOFC system 100, a compliant insulating layer 260 may be provided in gap 250 between the resilient insulating layer 210 and the sidewall 330 of the outer housing 300 of the SOFC system 100. The resilient insulation layer 210 may be made of any suitable thermally insulating resilient material, such as a pourable material, e.g., a free flow material or a solid granular material. The compliant layer 260 may be made of any suitable material, such as thermally resistant felt, paper, or wool. As used herein, a "compliant" material is a material that compresses and expands by at least 10 volume percent without damage. The base cavity 102 (also illustrated in FIG. 3), which is at least partially defined by stack support base 500, the bottom wall 332 of the base pan 502 of the housing 300 and the sidewall 330 of the outer housing 300, may be filled with a base insulation 901, such as a microporous board 501, a pourable insulation 902, or a combination thereof, as discussed in more detail below. In an exemplary embodiment, the microporous board 501 fills one quarter or less of the volume of the base portion cavity 102 of the housing 300.

Heat fluctuations during operation of the SOFC, may cause the thin outer housing 330 (e.g. a metal housing) to expand and contract more rapidly than the more massive internal components of the SOFC system (e.g. stacks, etc.). This, in turn, may result in fatigue and damage to the insulation shell/containment and/or to the outer housing 300 and/or to the cathode recuperator. Further, absent a compliant insulating layer 260 in the gap 250 between the resilient insulating layer 210 and the sidewall of the outer housing 330, a gap may be generated that is large enough to allow the compression resistant (i.e. resilient) pourable insulation 210 to escape the SOFC system, if the sidewall 330 of the outer housing 300 expands faster than the internal components of the SOFC system. However, the addition of a compliant insulating layer 260 in the gap 250 between the resilient insulating layer 210 and the sidewall of the outer housing 330 absorbs the stresses caused by expansion of the internal components of the SOFC system, thereby protecting the outer housing 300, the cathode recuperator 200, the resilient layer 210 and/or the compliant insulating layer 260 and expands to fill any gaps formed if the outer housing 300 expands faster than the internal components of the SOFC system. In other embodiments, at least 30 vol. %, such as at least 50%, e.g., 30-100 vol. %, e.g. 50-75 vol. % of the base cavity is filled with pourable insulation.

Figure 2:
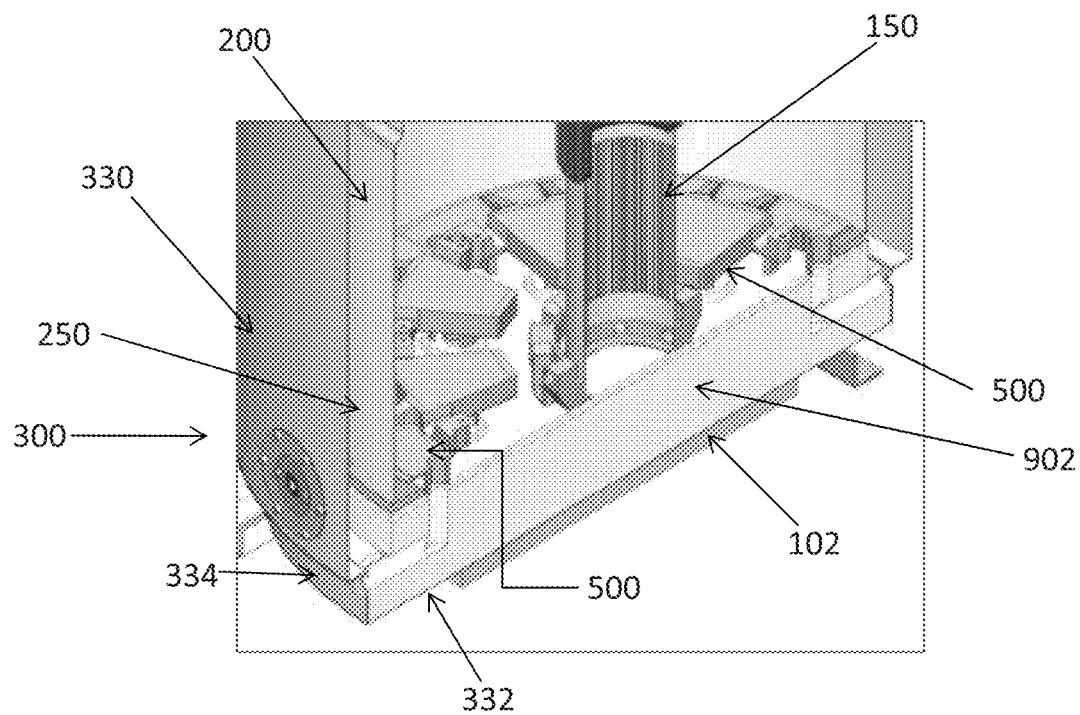
FIG. 2 is a three dimensional cut-away view illustrating the base portion of a SOFC system according to another exemplary embodiment.

FIG. 2 illustrates another exemplary embodiment of an SOFC system. In this embodiment, the base cavity 102 in the base pan 502 below the stack support base 500 is completely filled with a pourable insulation material 902. The insulation material 902 may be "self healing", in that it flows around tubing (e.g. Tube 900) or instrumentation that is inserted into the base of the SOFC hot box. In this manner, the insulation material 902 prevents leaks due to feed-through holes made to introduce tubing or instrumentation into the SOFC. In an exemplary embodiment, a cavity between the side insulation (e.g. Layers 210 and/or 260) and the base is accessed to fill the base cavity 102 with insulation material 902 in a single step. In an exemplary embodiment, the resilient insulating layer 210 is made of the same material as the insulation material 902 and is formed in one filling step, after forming the compliant insulting layer 260. The insulation material 902 may be supplied to the cavity 102 via an opening 334 in the sidewall 330 of the outer housing 300 of the system (e.g. Opening 334 in the base pan 502).

Figure 3:
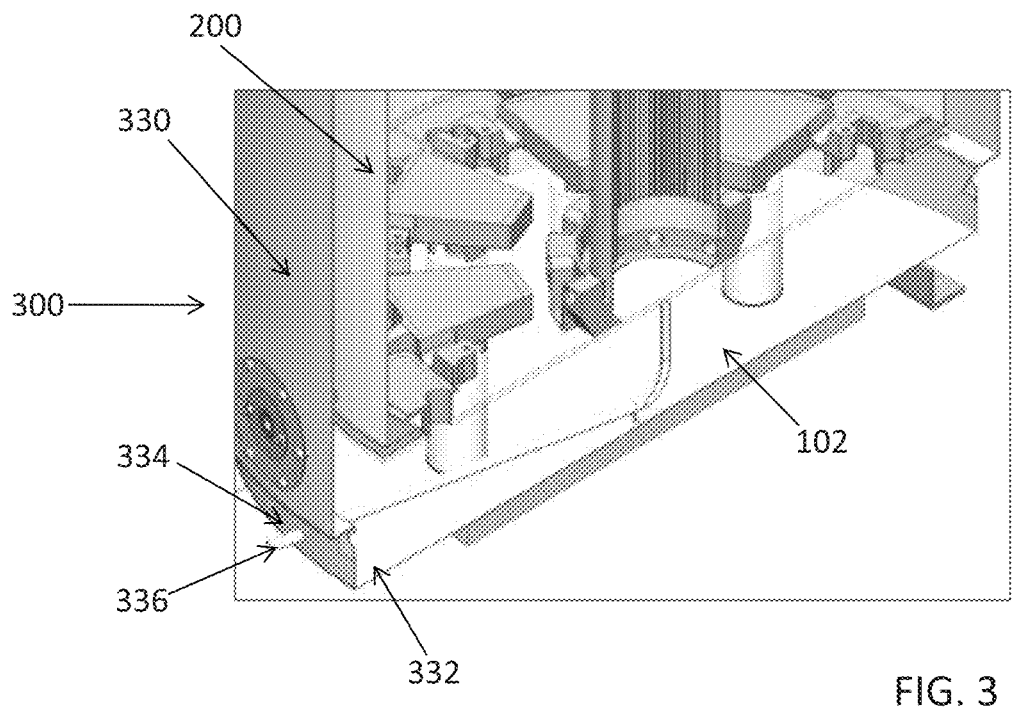
FIG. 3 is a three dimensional cut-away view illustrating the base portion of a SOFC system according to another exemplary embodiment.

FIG. 3 illustrates another exemplary embodiment of a method to fill the base cavity with a pourable insulation material. One end of a fill tube 336 extends out of the housing 300 through the opening 334 in the sidewall 330 of the housing 300. The other end is located in the base cavity 102 near a top portion of the base cavity 102. For example, the other end may be disposed near a central portion of the base cavity 102 (i.e. under the central plenum 150). In this embodiment, a vacuum may be applied to the fill tube 336 to aid with filling the base cavity 102 with the insulation material 902, for example, through the gap between the cathode recuperator 200 and the housing 300.

Figure 4:
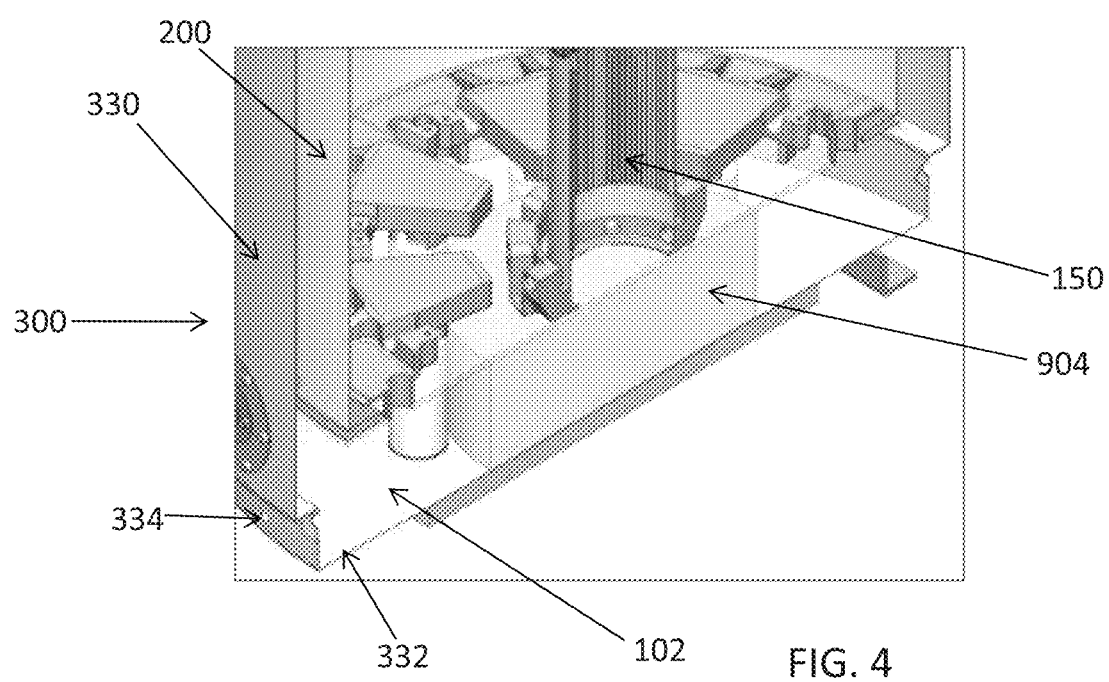
FIG. 4 is a three dimensional cut-away view illustrating the base portion of a SOFC system according to various embodiments.

Another exemplary embodiment is illustrated in FIG. 4. In this embodiment, a central portion of the base cavity 102 is filled with solid insulation material, such as a microporous board 904. The remainder of the base cavity 102 is filled with the pourable insulation material 902.

Figure 5:
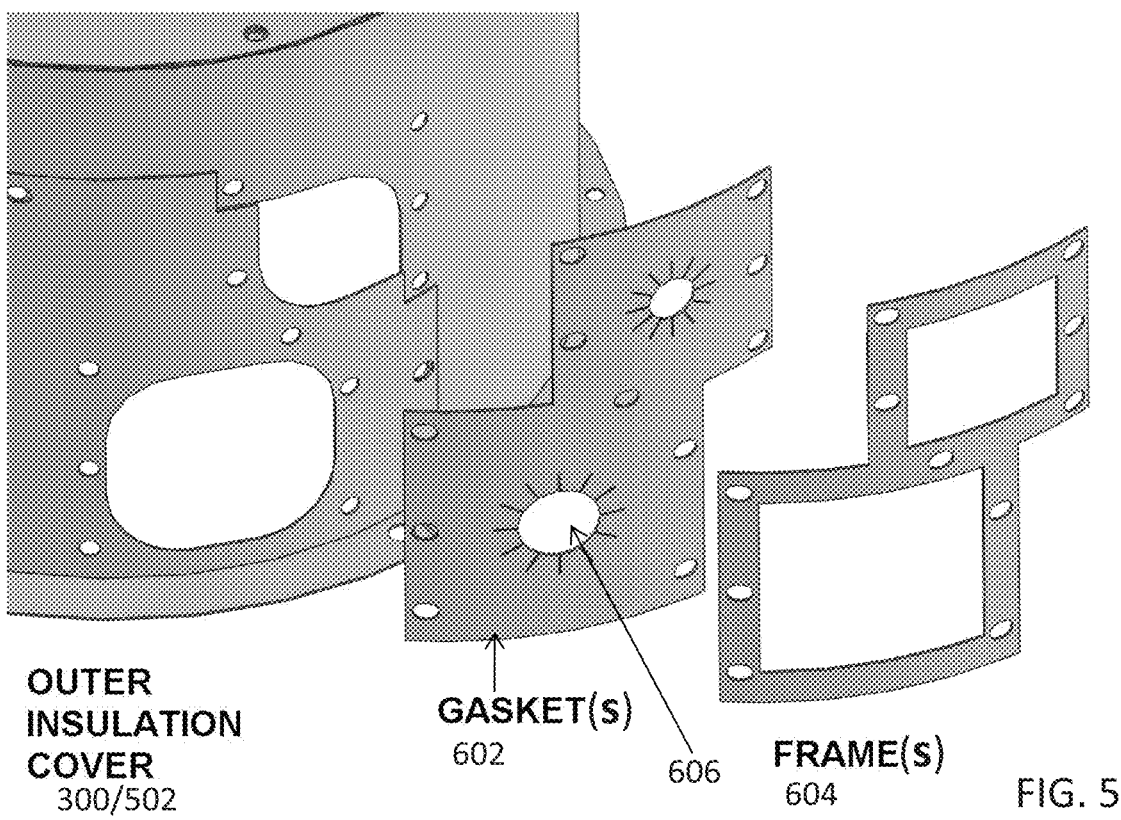
FIG. 5 is an exploded view of gasket and frame of a SOFC system according to various embodiments.

FIG. 5 illustrates another exemplary embodiment. In this embodiment, a gasket 602 and a frame 604 are provided to assist in sealing of plumbing, such as a fuel input or oxidant input pipes or conduits, bridging tube 900, and/or instrumentation penetrations through the outer housing 300, including openings for glow plug insertion and accompanying wiring. The gasket 602 made be made of any suitable material, such as silicon-coated fiberglass. The fiberglass provides high temperature resistance, while the silicon coating restrains the fine particles of insulation material 902 from flowing out of the base cavity 102. In some embodiments, the gasket 602 is made of a flexible material and can stretch slightly to accommodate expansion and contraction of the sidewall 330 of the outer housing 300, during operation of the SOFC system.

The frame 604 may be provided to secure the gasket 602 to the sidewall 330 of the outer housing 300 (e.g. to the sidewall of the base pan 502 portion of the outer housing 300). For example, the gasket 602 may be disposed between the frame 604 and the sidewall 330, while bolting the frame 604 to the sidewall 330. Instrumentation including, for example, the glow plug or heating element and associated wiring, (thermocouples, etc.), pipes, tubes, etc. pass through openings 606 in the gasket(s) 602.

FIGS. 6A-6E illustrate elements of a glow plug 806, according to various embodiments of the present disclosure. In particular, FIGS. 6A and 6B respectively illustrate side and top views of a sealing element 800, FIGS. 6C and 6D respectively illustrate top and side views of the glow plug 806, and FIG. 6E illustrates an enlarged portion of the glow plug 806 of FIG. 6D.

Referring to FIGS. 6A and 6B, the sealing element 800 may be top hat-shaped, funnel-shaped or the like. The sealing element 800 may be formed from a thin sheet of metal. For example, the sealing element 800 may be formed from an austenitic nickel-chromium alloy, glass, or a combination thereof. In particular, the sealing element 800 may be formed of an Inconel alloy, in order to provide superior high temperature oxidation resistance properties. The sealing element 800 may have a base 804 that has a substantially flat, annular shape. The sealing element 800 may further have a tubular collar 802 that extends from the base 804. The collar 802 may extend orthogonally from the base 804. In particular, the sealing element 800 may be curved where the collar 802 and base 804 are connected.

An inner diameter of at least a portion of the collar 802 may be configured to correspond with the outer diameter of a heating element 808 shown in FIGS. 6C, 6D, and 6E, such that it can be closely mated with the heating element 808. If additional sealing is desired between the inner surface of the collar 802 and the heating element 808, some spacing may be provided therebetween that corresponds to the finished thickness of the sealing material, or that allows for sealing material to flow into the space. An advantage of the sealing element 800 is that the funnel or top hat geometry thereof allows for improved sealing, such as by brazing or laser welding.

Referring to FIGS. 6C and 6D, the glow plug 806 may include the heating element 808 and a housing 812 from which the heating element 808 extends. The heating element 808 may be formed from a ceramic material. The housing 812 may be formed of a metal or an alloy. The housing 812 may have a first end configured to mate with a reaction chamber the facilitate insertion of the heating element 808 into a reaction chamber of the SOFC system (e.g., inside of the hot box). In particular, a portion of the housing 812 may be threaded to mate with a corresponding threaded portion of the reaction chamber. The housing 812 may further have an opposing second end configured to facilitate an electrical connection to the heating element 808.

As shown in FIG. 6E, the sealing element 800 may be coupled to the heating element 808 and the housing 812. The sealing element 800, the heating element 808, and the housing 812 may be coupled, so as to form a fluid-tight seal, by various methods, such as by brazing using, for example, an activated braze alloy ("ABA") gold brazing material, laser welding, or the like. In particular, an inner surface 816 of the collar 802 of the sealing element 800 may be adhered to the heating element 808, and a bottom surface 814 of the base 804 of the sealing element 800 may be adhered to the housing 812. The ABA gold brazing material may be a high-purity active braze alloy of gold, nickel, and titanium manufactured by Morgan Advanced Material, including, by weight, 96.4% Au, 3.0% Ni, and 0.6% Ti.

Alternatively or additionally, a sealing ring 809 may be disposed around the heating element 808, in the housing 812. In various embodiments, these sealing elements may operate to isolate a working end of the heating element 808 in the reaction chamber.

The sealing element 800 may have a coefficient of thermal expansion (CTE), which is configured to be compatible with a CTE of the heating element 808, in order to reduce the formation of micro-cracks in the heating element due to thermal expansion. For example, the CTE difference between the sealing element 800 and the heating element 808 may be less than about 10% (e.g., about 0 to 5%). Herein, a "CTE" refers to a fractional change in dimension per degree change in temperature at a constant pressure. Several types of CTEs may be referenced, such as volumetric CTE, area CTE, and linear CTE. In order to be compatible, the respective CTEs of the heating element 808 and the sealing element 800 may be closely matched as described above, over the operating temperature ranges to which these elements are exposed. For example, the CTE of the heating element 808 in a radial direction along a longitudinal axis should be set such that radial expansion does not exceed the expansion of the sealing element 800, due to the CTE of the sealing element 800 in a corresponding radial direction. One or more of the respective CTEs in linear, area, and volume directions of the heating element 808 and the sealing element 800 should also be matched as described above. In additional or alternative embodiments, the CTE of additional components, such as the housing 812 may be taken into account, due to fixing of the sealing element 800 and the housing 812. Further, the CTE of any sealing material, such as brazing material, may be considered in various embodiments.

In various embodiments, the sealing element 800 may be sufficiently thin, so as reduce stress on the heating element 808, when brazing or welding operations are conducted. In conventional glow plugs, a solid metal ring, typically formed from copper, may be brazed between a heating element and a housing. In contrast, the sealing element 800 may be formed from a thin sheet of metal that is sufficiently compliant to conform to changes in the diameter or shape of the heating element 800 during thermal cycles, without inducing micro-cracks in the heating element 808. The sealing element 800 may be further advantageously formed from an alloy to improve the properties thereof. For example, the sealing element 800 may be formed from an austenitic nickel-chromium alloy, such as an Inconel alloy, in order to provide superior high temperature oxidation resistance properties.

By utilizing an Inconel alloy instead of copper for the sealing element, a higher melting temperature brazing material may be used to braze the sealing element 800, thereby improving component reliability. Further, as compared to copper, Inconel has superior high temperature oxidation resistance properties. Assembly processes for exemplary glow plugs may be further improved, by reducing the number of braze cycles, for example, from 2 to 1.

Further challenges may arise in making connections to embodiment glow plugs. In various embodiments, brazing may utilize an ABA gold braze at some or all braze junctions. By utilizing ABA gold braze at brazed junctions, the life of glow plugs may be increased. Conventional glow plug assemblies utilize an AgCu28 braze, which includes a Ti2 paste. At high SOFC hotbox operational temperatures, high component failure rates may be experienced due to Ti activity, which may lead to the erosion and/or failure of ceramic heating elements and lead wires. The AgCu28 braze and/or Ti2 paste react at temperatures of 779 degrees C. and above, resulting in the erosion of the ceramic heating element over time. In contrast, ABA gold braze is rated for higher temperatures and will not re-flow at temperatures below 1030 degrees C. Other brazes that do not flow at temperatures of 1000 degrees C. and below may also be used.

FIGS. 7A and 7B are respectively a perspective view and a top plan view of a landing pad 1000. FIGS. 7C and 7D are respectively a side view and a top plan view of the landing pad 1000 attached to a heating element 808. Referring to FIGS. 7A-7D, the landing pad 1000 may be formed from a nickel silicon alloy (Nisil). A typical Nisil alloy contains 4 to 5 wt % silicon, such as around 4.4 wt % silicon, and at least 94 wt % nickel, such as 95-96 wt % nickel.

The landing pad 1000 may have a collar 1002 and a lead connection 1004 extending from the collar 1002. The collar 1002 may be formed in a semicircular configuration, so as to at least partially encircle the heating element 808. The landing pad 1000 may be coupled with Nisil lead wire 1018. In particular, the lead wire 1018 may be brazed to the lead connection 1004, and the collar 1002 of the landing pad 1000 may be brazed to the heating element 808, using ABA gold braze. Although not shown in FIGS. 7A-7C, a second lead wire may be attached to the heating element 808.

The landing pad 1000 and/or the ABA gold brazing may operate to improve glow plug reliability by, for example, mitigating the risk of micro-crack formation during thermal cycling. It has been observed that cross-sections of the coiled lead wire area on used glow plugs utilizing conventional lead materials indicate micro-crack formation and growth, due to CTE mismatch. By using Nisil in the landing pad 1000 and the lead wires, stresses on the heating element 808 due to thermal expansion may be reduced, and an improved metallic surface for brazing lead wires may be provided.

For conventional glow plug lead wires, copper, nickel plated copper, and nickel are commonly selected materials. However, at elevated temperatures, these conventional materials oxidize quickly and result in failure of the glow plug. In contrast, by utilizing Nisil for the landing pad 1000 and the lead wires, high temperature operation and exceptional corrosion resistance at elevated temperatures may be provided. Further Nisil provides superior electrical conductivity for the landing pad 1000 and the lead wires. Still further, the Nisil landing pad 1000 may reduce stresses caused by thermal expansion of the heating element 808 and provide a compliant layer that conforms to the natural expansion and contraction of the ceramic heating element during operation of the SOFC system.

In alternative embodiments, the Nisil lead wire 1018 may be directly brazed to the heating element 808. In particular, the lead wire 1018 may be flattened at the point of contact with the heating element 808 prior to brazing, to increase an electrical contact area.

In further embodiments, as illustrated in FIG. 7E, a glow plug 807 may include a heating element 808 that extends from a housing 812. The heating element 808 may include a working end 808a and an opposing electrical coupling end 808b. The working end 808a of the heating element 808 may be inserted into a reaction chamber of the SOFC and interact with the fuel in the reaction chamber to promote combustion. The electrical coupling end 808b of the heating element 808 may be isolated from the reaction chamber through sealing as described herein. Although not shown, the glow plug 807 may further include the sealing element 800.

A lead wire 1112 may be coupled to the electrical coupling end 808b of the heating element 808. A sealing ring 1100, such as a metal ring, is brazed to both the heating element 808 and the housing 812, to seal the housing 812. In various embodiments, the lead wire 1112 may be a Nisil lead wire, which may be coupled, through ABA gold brazing inside of the electrical coupling end 808b of the heating element 808. The electrical coupling end 808b of the heating element 808 may be provided with a recess, hollow core, indentation, or similar feature for coupling with the lead wire 1112.

The glow plug includes a second lead wire 1114 coupled to an outer surface of the electrical coupling end 808b of the heating element 808. For example, the lead wire 1114 may be wrapped around the electrical coupling end 808b of the heating element 808. Providing the wrapping of the lead wire 1114 may improve the resiliency and integrity of the coupling by providing additional coupling surface area between the surface of the heating element 808 and the lead wire 1114. The configuration of the lead wire 1114 and the resulting coupling may further provide a degree of stress relief for the connection, which may increase reliability of the connection, such as after repeated temperature cycling. The lead wire 1114 may be a Nisil lead wire, which may be coupled through ABA gold brazing to the outer surface near a connection end of the heating element 808. In some embodiments, the lead wire 1114 may be attached using the landing pad 1000, or the end of the lead wire 1114 may be flattened prior to attachment, as described above.

As shown in FIG. 7E, the ABA gold braze connects at least one of a metal sealing ring 1100 to a ceramic heating element 808 of the glow plug, the metal sealing ring to a housing 812 of a fuel cell system, a center lead wire 1112 (e.g., Nisil alloy wire) to a hollow inner portion of the ceramic heating element 808, and/or a coiled lead wire 1114 (e.g., Nisil alloy wire) to an outer portion of the ceramic heating element 808.

An advantage of using ABA gold braze is that a ceramic material may be bonded to metal without having to first metalize the ceramic. By utilizing ABA gold braze rather than AgCu28+Ti2 paste at braze junctions, erosion of the heating element 808 at temperatures greater than about 779 degrees C. may be prevented. Furthermore, ABA gold braze allows a single braze material to be used during glow plug assembly. Use of ABA gold braze further may reduce the number of braze cycles, for example, from 3 to 1.

Figure 8A:
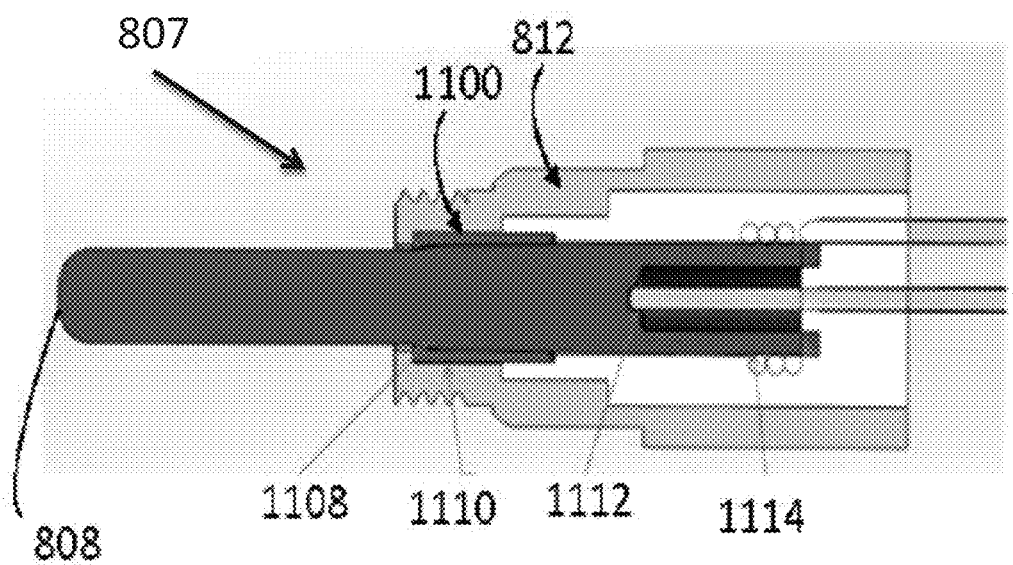
FIGS. 8A and 8B are side cross-sectional views of a glow plug assembly according to various embodiments.

As illustrated in FIG. 8A, an additional or alternative glass sealing ring 1100 may be used to seal the glow plug 807. The sealing ring 1100 may include an inner sealing portion 1108 that seals with the heating element 808. The sealing ring 1100 may further include an outer sealing portion 1110 that seals with the housing 812. The sealing ring 1100 may be formed from a glass material to provide an internal seal for the glow plug 807. The sealing ring 1100 may ensure that no fuel or air leaks from the inside of the hot box to the outside environment, at the point where the glow plug 807 is inserted into the casing of the SOFC.

By forming the sealing ring 1100 with a glass material, unique advantages may be provided. For example, at operating temperatures of the SOFC and hot box, the housing 812 and the ceramic heating element 808 may expand or "grow" due to thermal expansion. With the corresponding increase in temperature, the glass sealing ring 1100 may soften sufficiently such that the glass material at least partially plasticizes. By softening with the increase in temperature and the corresponding expansion of the glow plug components, the glass sealing ring 1100 may comply, conform or yield with the change in geometry, while continuing to remain bonded to the housing 812 and the heating element 808. Glass materials are generally inert due to the density of the Si—O molecular bonding network. Therefore, because the sealing ring 1100 is formed from a glass material, the sealing ring 1100 may be prevented from chemically reacting with the ceramic heating element 808, which may potentially cause failures. As discussed above, conventional glow plugs use AgCu28 and Ti2 paste to seal. At temperatures above about 779 degrees C., the titanium in AgCu28 and Ti2 paste may react with and erode a ceramic heating element.

By utilizing glass material for the sealing ring 1100, a fluid-tight sealing may be achieved by simpler processes than what is possible with traditional brazing. Further, glass material may be advantageously bonded to both metallic and ceramic surfaces. Still further, glass materials soften with increasing operating temperatures, thereby lowering the risk of micro-crack formation within the ceramic heating element 808 during thermal cycling. Thus, the CTE of the glass may be matched with that of the heating element 808.

Figure 8B:
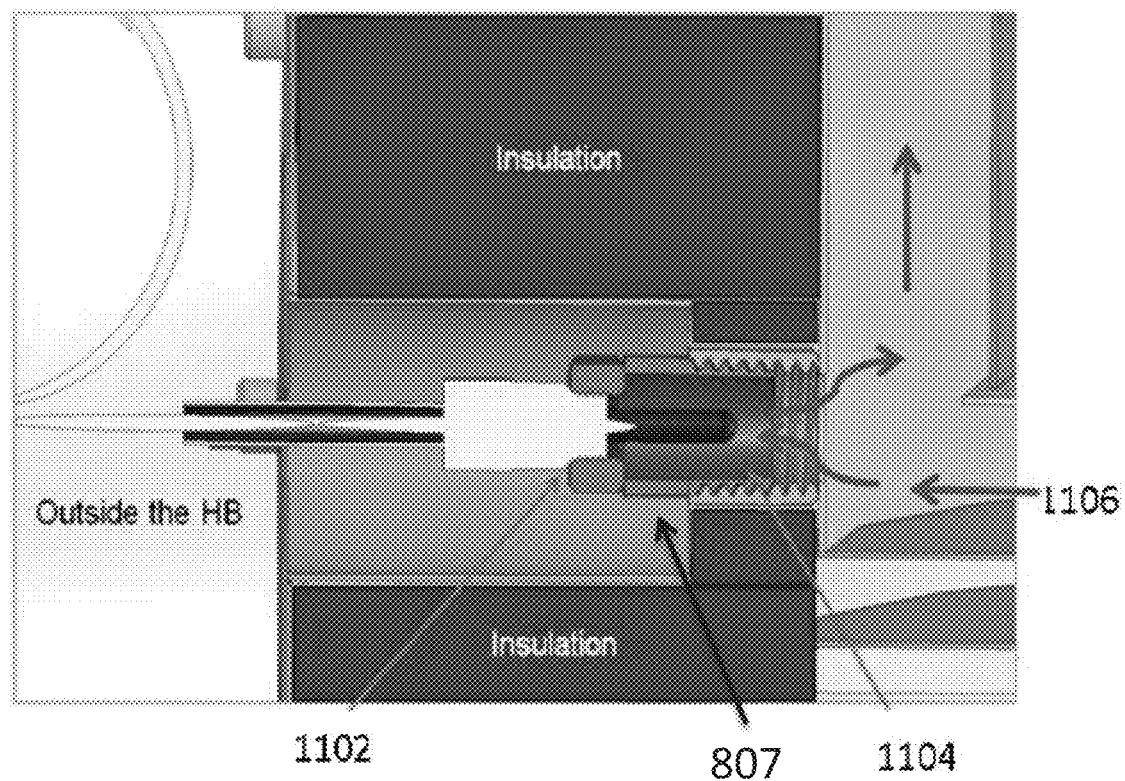

In the various embodiments described herein, as illustrated in FIG. 8B, a seal may be provided between a relatively high-temperature reaction zone 1104, wherein an air/fuel flow 1106 may be present and a relatively low-temperature coupling zone 1102.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A solid oxide fuel cell system comprising:
a hot box housing containing a reaction chamber;
a fuel cell stack disposed in the hot box housing; and
a glow plug extending through an opening of the hot box housing into the reaction chamber, wherein the glow plug comprises:
a housing having a threaded first end which is mated with a threaded portion of the hot box housing;
a heating element disposed in the housing and having a working end extending from the threaded first end of the housing into the reaction chamber, such that the working end of the heating element is exposed in the reaction chamber outside of the threaded first end of the housing; and
a sealing element disposed entirely outside of the housing, wherein the sealing element is located entirely outside the threaded first end of the housing and inside the reaction chamber in the hot box housing, and wherein the sealing element forms a fluid-tight connection between the threaded first end of the housing and the exposed working end of the heating element, the sealing element comprising:
an annular base attached to an outer surface of the threaded first end of the housing by brazing or welding; and
a tubular collar extending from the base and attached to the exposed working end of the heating element by brazing or welding,
wherein the sealing element is formed from a sheet of metal that is bent such that the sealing element is curved where the collar and the base are connected, the base extends orthogonally from the collar, and a thickness of the base is the same as a thickness of the collar.

2. The solid oxide fuel cell system of claim 1, wherein the sealing element is attached to the housing and heating element by laser welding.

3. The solid oxide fuel cell system of claim 1, wherein the sealing element is attached to the housing and heating element by an activated brazing alloy gold braze.

4. The solid oxide fuel cell system of claim 1, wherein the sealing element comprises an austenitic nickel-chromium alloy.

5. The solid oxide fuel cell system of claim 1, further comprising a landing pad disposed in the housing, the landing pad comprising a landing pad collar attached to the heating element and a lead connection extending from the collar.

6. The solid oxide fuel cell system of claim 5, wherein the landing pad comprises a nickel-silicon alloy.

7. The solid oxide fuel cell system of claim 6, further comprising a lead wire attached to the lead connection using an activated brazing alloy gold braze, the lead wire comprising a nickel-silicon alloy.

8. The solid oxide fuel cell system of claim 5, further comprising a lead wire comprising a nickel-silicon alloy and having a flattened end, the flattened end being attached to the heating element using an activated brazing alloy gold braze.

9. The solid oxide fuel cell system of claim 5, further comprising a center lead wire attached to the heating element using an activated brazing alloy gold braze.

10. The solid oxide fuel cell system of claim 5, wherein the landing pad collar extends orthogonally from the lead connection.

11. The solid oxide fuel cell system of claim 5, wherein the heating element comprises a ceramic material.

* * * * *